US007979686B1

(12) United States Patent
Robles (10) Patent No.: US 7,979,686 B1
(45) Date of Patent: *Jul. 12, 2011

(54) SYSTEM AND METHOD FOR ISOCHRONOUS TASK SWITCHING VIA HARDWARE SCHEDULING

(75) Inventor: David Morgan Robles, Alameda, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/710,839

(22) Filed: Feb. 23, 2010

Related U.S. Application Data

(63) Continuation of application No. 11/590,205, filed on Oct. 31, 2006, now Pat. No. 7,698,541.

(51) Int. Cl.
*G06F 9/46* (2006.01)
(52) U.S. Cl. ............ 712/244; 718/108; 718/107
(58) Field of Classification Search .......... 712/244
See application file for complete search history.

(56) References Cited

U.S. PATENT DOCUMENTS

| 4,494,189 | A | | 1/1985 | Bean et al. |
| 5,210,873 | A | * | 5/1993 | Gay et al. ............ 718/107 |
| 5,509,134 | A | | 4/1996 | Fandrich et al. |
| 5,564,060 | A | | 10/1996 | Mahalingaiah et al. |
| 5,598,549 | A | | 1/1997 | Rathunde |
| 5,668,811 | A | | 9/1997 | Worsley et al. |
| 5,668,971 | A | * | 9/1997 | Neufeld ............ 711/111 |
| 5,689,713 | A | | 11/1997 | Normoyle et al. |
| 5,802,345 | A | | 9/1998 | Matsunami et al. |
| 5,887,175 | A | | 3/1999 | Col et al. |
| 6,026,471 | A | * | 2/2000 | Goodnow et al. ............ 711/137 |
| 6,031,843 | A | | 2/2000 | Swanberry et al. |
| 6,061,709 | A | | 5/2000 | Bronte |
| 6,070,219 | A | | 5/2000 | McAlpine et al. |
| 6,430,594 | B1 | | 8/2002 | Akiyama et al. |
| 6,473,898 | B1 | | 10/2002 | Waugh et al. |

(Continued)

FOREIGN PATENT DOCUMENTS

EP 420142 A2 4/1991

OTHER PUBLICATIONS

U.S. Appl. No. 11/590,205 entitled System and Method for Isochronous Task Switching Via Hardware Scheduling, filed Oct. 31, 2006 by David Morgan Robles, 24 pages.

*Primary Examiner* — Eddie P Chan
*Assistant Examiner* — Idriss N Alrobaye
(74) *Attorney, Agent, or Firm* — Cesari and McKenna, LLP (57) ABSTRACT

A multiplexed hierarchical array of interrupt controllers is configured to enable low latency task switching of a processor. The hierarchical array comprises a plurality of interrupt controllers coupled to a root interrupt controller. For each task that the processor is configured to execute, a corresponding interrupt controller is provided. To switch the processor to a task, the corresponding interrupt controller signals the root interrupt controller which, in turn, sends an interrupt and a Task Identifier to the processor. The root interrupt controller also cooperates with an access multiplexer/demultiplexer to select the corresponding interrupt controller for communication with the processor. By providing interrupt controller selection as well as task identification, the hierarchical array offloads arbitration and context switching overhead from the processor. That is, in response to the interrupt, the processor switches to the identified task and may access a memory address space dedicated to the task.

18 Claims, 4 Drawing Sheets

U.S. PATENT DOCUMENTS

| | | |
|---|---|---|
| 6,684,280 B2 | 1/2004 | Chauvel et al. |
| 6,766,347 B1 * | 7/2004 | Gulick .......................... 718/103 |
| 7,117,500 B2 | 10/2006 | Pulsipher et al. |
| 7,124,403 B2 | 10/2006 | Price et al. |
| 7,209,941 B2 | 4/2007 | Furusawa et al. |
| 7,539,991 B2 | 5/2009 | Leong |
| 2001/0049763 A1 | 12/2001 | Barry et al. |
| 2002/0087951 A1 | 7/2002 | Bang, II |
| 2003/0028362 A1 | 2/2003 | Nagaki et al. |
| 2003/0120713 A1 | 6/2003 | Fenchel |
| 2004/0153627 A1 | 8/2004 | Alcazar et al. |
| 2005/0193260 A1 | 9/2005 | Kato |
| 2006/0010308 A1 | 1/2006 | Haruki et al. |
| 2007/0157199 A1 | 7/2007 | Iwamoto |

* cited by examiner

SYSTEM AND METHOD FOR ISOCHRONOUS TASK SWITCHING VIA HARDWARE SCHEDULING

CROSS-REFERENCE TO RELATED APPLICATIONS

The present application is a continuation of commonly assigned U.S. patent application Ser. No. 11/590,205, which was filed on Oct. 31, 2006, by David Morgan Robles for a SYSTEM AND METHOD FOR ISOCHRONOUS TASK SWITCHING VIA HARDWARE SCHEDULING, now issued as U.S. Pat. No. 7,698,541 on Apr. 13, 2010, and is hereby incorporated by reference.

BACKGROUND OF THE INVENTION

1. Field of the Invention

The present invention relates to data processing systems, and more specifically to scheduling tasks for execution by a processor of a data processing system.

2. Background Information

A data processing system typically comprises one or more processing elements (i.e., processors) and a memory for storing software programs and data structures. An operating system (OS), typically resident in the memory and executed by each processor, functionally organizes the data processing system by, inter alia, invoking operations in support of software processes, tasks, and/or routines (hereinafter "tasks") executed by the processor. A known way to switch between tasks executed by the processor involves the use of an asynchronous signal, or "interrupt". A conventional interrupt controller generates the interrupt, typically in response to an external event. The OS typically processes the interrupt and dispatches an interrupt service routine to the processor. Thereafter, the processor typically invokes a context switch prior to executing the service routine. As used herein, a context switch (or "context switching") generally denotes (i) suspending execution of a task currently running on the processor, (ii) saving a state of the suspended task, (iii) retrieving a state of a new task ("service routine"), and (iv) executing the new task.

The amount of time required to switch processor tasks is typically referred to as the "interrupt latency". Factors that influence interrupt latency include arbitration among various interrupt controllers seeking (interrupt) access to the processor, as well as overhead associated with context switching. Lower interrupt latencies correspond to less time required to switch among tasks (i.e., faster task switching).

As the need for reliable high-speed processing of multiple tasks increases, a conventional OS may have an unpredictable and/or undesirably high interrupt latency. This unpredictable and/or high interrupt latency may limit the effectiveness of the data processing system, particularly in the case of an embedded data processing system. As used herein, an embedded data processing system includes a processor that is implemented within a device controlled by the processor. For example, an embedded data processing system may be implemented as a Fibre Channel (FC) host bus adapter (HBA). In such an implementation, high interrupt latencies may reduce the possible throughput/bandwidth of the HBA, especially if, e.g., different tasks are associated with sending and/or receiving signals from different ports of the HBA.

To reduce the interrupt latency during task switching, an embedded data processing system may utilize a Real-Time Operating System (RTOS) in place of the conventional OS. An RTOS typically employs specialized scheduling algorithms to decrease interrupt latency, and, when implemented with appropriately programmed software, may substantially stabilize and increase the predictability of task switching. However, a noted drawback of both a conventional OS and an RTOS is that they both consume memory which, in turn, adds cost and complexity, as well as consumes power. Moreover, because these prior art methods require use of an operating system to process the interrupt and schedule the task switch, the interrupt latency may still be undesirably high.

SUMMARY OF THE INVENTION

The disadvantages of the prior art are overcome by providing a multiplexed hierarchical array of interrupt controllers configured to enable low latency task switching of a processor. The hierarchical array comprises a plurality of interrupt controllers coupled to a root interrupt controller. For each task that the processor is configured to execute, a corresponding interrupt controller is provided. To switch the processor to a given task, the corresponding interrupt controller signals the root interrupt controller which, in turn, sends an interrupt and a Task Identifier (ID) to the processor. The root interrupt controller also cooperates with an access multiplexer/demultiplexer to select the corresponding interrupt controller for communication with the processor. By providing interrupt controller selection (arbitration) as well as task identification, the multiplexed hierarchical array offloads arbitration and context switching overhead from the processor. That is, in response to the interrupt, the processor merely switches to the identified task and may access a corresponding memory address space dedicated to the task. Accordingly, the multiplexed hierarchical array of interrupt controllers provides a hardware scheduling mechanism that quickly and efficiently enables isochronous task switching of the processor.

In an illustrative embodiment, an intermediate network device, such as a multi-protocol data security appliance, is coupled to a computer network through one or more host bus adapters (HBAs). Each HBA may be configured as an embedded data processing system having one or more ports for sending and/or receiving Fibre Channel (FC) frames and having a processor core adapted to execute a predetermined number of tasks. Exemplary tasks include extracting and altering a header of an incoming FC frame depending on which port received the frame. To handle the high data rate (and corresponding low interrupt latency) of a FC connection, the processor core is configured to switch tasks faster than would ordinarily be possible using a conventional operating system (OS) or Real-Time Operating System (RTOS). It should be noted that the principles of the present invention may be implemented using other forms of connectivity, e.g., Ethernet packets, or more generally any form of network data packages. As such, the description of processing FC frames should be taken as exemplary only.

Illustratively, task selection is accomplished via hardware scheduling using individual dedicated interrupt controllers called "activation blocks". Illustratively, one activation block is provided for each task the processor core is configured to execute. For example, where the current task is determined by which port received the FC frame, one activation block is provided for each port. Upon receiving a FC frame at a port, the corresponding activation block generates an interrupt signal directed to a root activation block. The activation block may also contain a timer configured to generate an interrupt signal in the absence of receipt of a frame after a predetermined amount of time and/or periodically. The root activation block receives the interrupt signal, correlates the signal with a Task ID, and sends an interrupt and the Task ID to the processor core. In response to receiving the interrupt and Task ID, the processor core saves the state of its current task and rapidly and isochronously switches to a new task identified by the Task ID. To that end, the processor core may access a dedicated memory address space corresponding to the new task. Additionally, the access multiplexer/demultiplexer may use the Task ID as a control input to select the corresponding activation block for communication with the processor core. Thus, the present invention accomplishes task switching via hardware scheduling without requiring an OS or RTOS to perform interrupt processing at the HBA.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

The present invention may be applied with particular advantage to secure networked data storage. Accordingly, the following illustrative embodiment describes application of this invention to a multi-protocol data security appliance in a computer network. The principles described herein may apply more generally, however, to any computer or data processing system, including a computer networking appliance. Therefore, the illustrative embodiment should be taken as exemplary only and is not intended to limit the scope of the invention.

Figure 1:
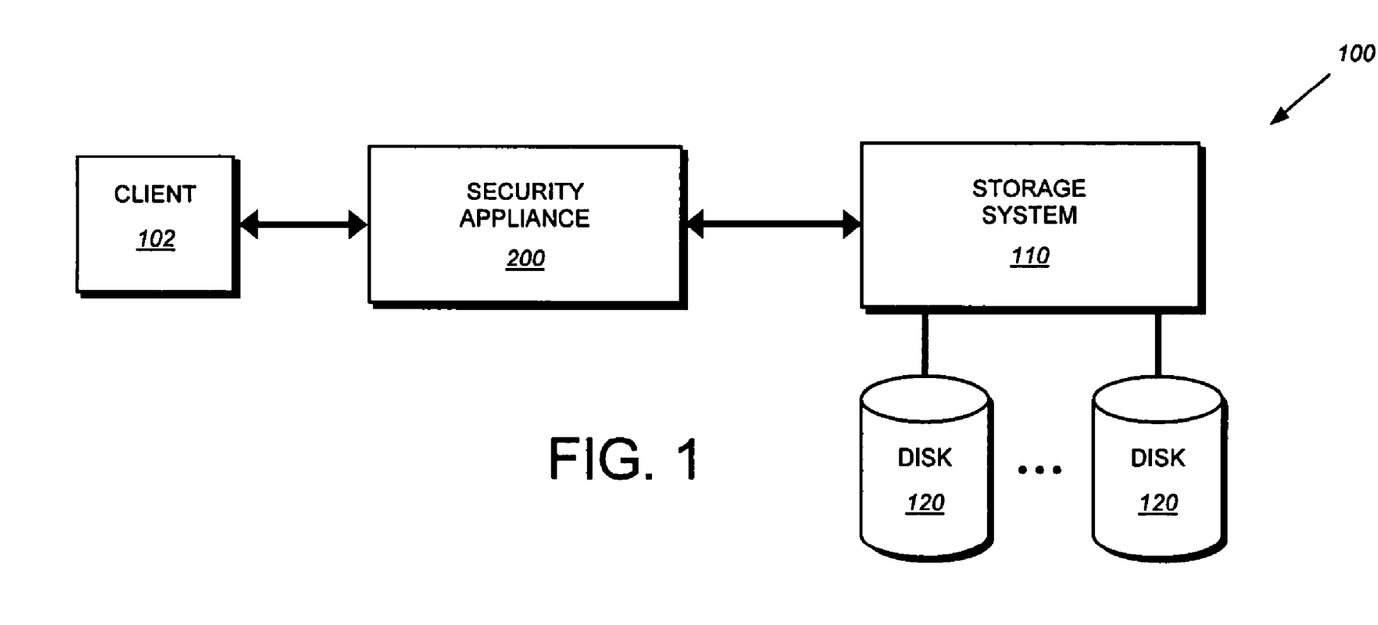
FIG. 1 is a schematic block diagram illustrating a computer network environment including a multi-protocol security appliance that may be advantageously used with an embodiment of the present invention.

In a computer network environment, information (data) may be stored in secure storage served by a storage system. FIG. 1 is a schematic block diagram illustrating a computer network environment 100 including a multi-protocol security appliance 200 that may be coupled between one or more clients 102 and the storage system 110. The security appliance is configured to intercept data access requests and to transform unencrypted data (cleartext) generated by the clients (or initiators) into encrypted data (ciphertext) destined for secure storage on the storage system (or target). Each client 102 may comprise an application executing on a computer that "connects" to the storage system over a computer network, such as a point-to-point link, a Fiber Channel (FC) connection, a shared local area network (LAN), a wide area network (WAN), or a virtual private network (VPN or VLAN) implemented over a public network, such as the Internet. Clients 102 typically communicate with the storage system 110 by exchanging discrete frames or packets of data according to predefined protocols, such as the Transmission Control Protocol/Internet Protocol (TCP/IP) or the Small Computer Systems Interface (SCSI) encapsulated in FC (FCP).

For example, in the case of a write request issued by the client 102, the security appliance 200 intercepts the request, encrypts the data associated with the request, and forwards the encrypted data to the storage system 110 for storage at a specified location (address) on the disks 120. In the case of a read request, the security appliance 200 intercepts the request and forwards it to the storage system 110, which returns the requested data to the appliance 200 in encrypted form. The security appliance 200 then decrypts the encrypted data and returns the decrypted data to the client 102.

Figure 2:
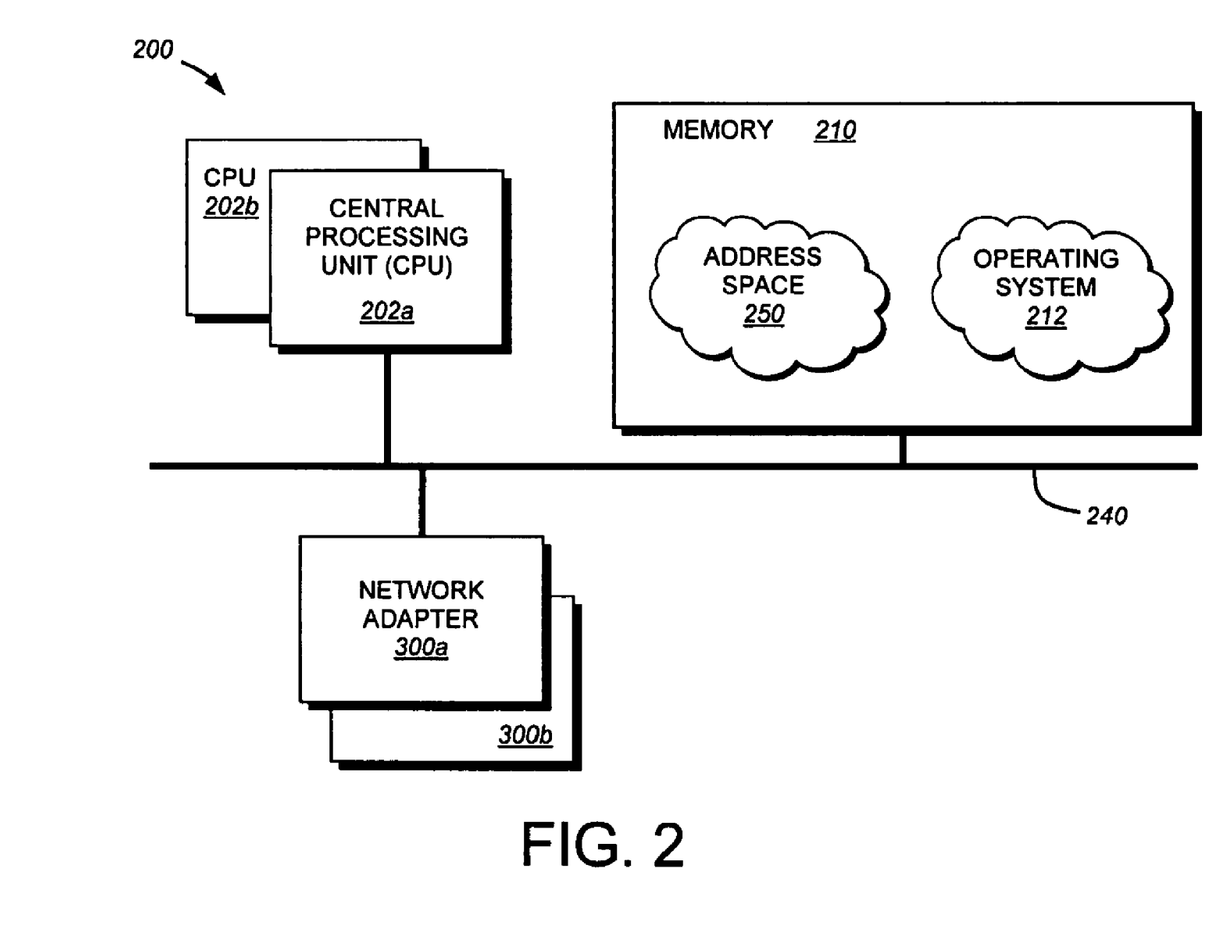
FIG. 2 is a schematic block diagram illustrating the multi-protocol security appliance that may be advantageously used with an embodiment of the present invention.

FIG. 2 is a schematic block diagram illustrating the multi-protocol security appliance 200 that may be advantageously used with the present invention. The security appliance 200 typically comprises one or more processors 202a,b, e.g., central processing units (CPUs) adapted to perform data encryption and decryption, a memory 210 adapted to store software programs and data structures, and one or more network adapters 300a,b, each having mechanical, electrical, and signaling circuitry needed to connect the appliance 200 to, e.g., a FC network. The CPUs 202a,b, memory 210, and network adapters 300a,b may be interconnected by a system bus 240, such as a conventional Peripheral Component Interconnect (PCI) bus. The CPUs 202a,b and network adapters 300a,b typically include processing elements configured to execute the software programs stored in the memory 210. The processing elements may comprise one or more programmable processors, application-specific integrated circuits (ASICs), processor cores, and/or similar data processing systems.

An operating system (OS) 212, typically resident in memory 210 and executed by the processing elements, may functionally organize the appliance 200 by, inter alia, invoking security operations in support of software processes, tasks, and/or modules implemented by the appliance 200. The memory 210 may comprise any form of data storage, such as Random Access Memory (RAM), Non-Volatile RAM (NVRAM), or a disk. The OS 212 illustratively organizes the memory 210 into an address space arrangement available to multiple software processes, tasks, and/or modules executed by the security appliance 200. To schedule a process change (i.e., to switch processor tasks), the OS 212 typically processes an interrupt and dispatches an interrupt service routine to the CPU 202. The amount of time required to switch tasks is referred to as the "interrupt latency". Lower interrupt latencies correspond to less time required to switch tasks (i.e., faster task switching). Conversely, higher interrupt latencies correspond to more time required to switch tasks (i.e., slower task switching).

The illustrative security appliance 200 may perform data encryption and/or decryption on incoming and/or outgoing data; therefore the interrupt latency should be low enough to enable the processing elements to handle the rate of incoming and/or outgoing frames, because the processing elements may need to switch tasks in response to each sent and/or received FC frame. Otherwise, the security appliance 200 may introduce an undesirable delay in communication between the client 102 and the storage system 110. Depending on the computer network environment, the security appliance 200 may be configured to support different data access protocols and hardware which, in turn, may determine the desired interrupt latency. For example, in a storage area network (SAN) environment, the security appliance 200 may be configured to support various SCSI-based data access protocols, including SCSI encapsulated over TCP (iSCSI) and SCSI encapsulated over FC (FCP). In a network attached storage (NAS) environment, the security appliance 200 may be configured to support, e.g., the conventional Common Internet File System (CIFS) and the Network File System (NFS) data access protocols transmitted by, e.g., an Ethernet network.

Illustratively, the multi-protocol data security appliance 200 is coupled to a FC network and is configured to send and receive FC frames through a plurality of host bus adapters (HBAs). As network data communication rates improve, a conventional OS or a Real-Time Operating System (RTOS) may have an unpredictable and undesirably high interrupt latency for processing FC frames as they are sent and/or received by HBAs. Therefore, according to the present invention, the illustrative multi-protocol security appliance 200 is configured to enable low latency task switching via hardware scheduling. However, it should be noted that the principles of the present invention may be utilized with any form of network data packages, including, e.g., TCP/IP packets, etc. As such, the description of FC frames should be taken as exemplary only.

Specifically, an HBA is configured as an embedded data processing system having a multiplexed hierarchical array of interrupt controllers configured to enable low latency task switching of a processor within the HBA. The hierarchical array comprises a plurality of interrupt controllers coupled to a root interrupt controller. For each task that the processor is configured to execute, a corresponding interrupt controller is provided. To switch the processor to a given task, the corresponding interrupt controller signals the root interrupt controller which, in turn, sends an interrupt and a Task Identifier (ID) to the processor. The root interrupt controller also cooperates with an access multiplexer/demultiplexer to select the corresponding interrupt controller for communication with the processor. By providing interrupt controller selection (arbitration) as well as task identification, the multiplexed hierarchical array offloads arbitration and context switching overhead from the processor. That is, in response to the interrupt, the processor merely switches to the identified task and may access a corresponding memory address space dedicated to the task. Accordingly, the multiplexed hierarchical array of interrupt controllers provides a hardware scheduling mechanism that quickly and efficiently enables isochronous task switching of the processor. By isochronous it is meant, generally, that the processor requires a substantially equal time period to switch between any two processes, i.e., the time required to switch between processes is substantially identical regardless of the processes involved.

Figure 3:
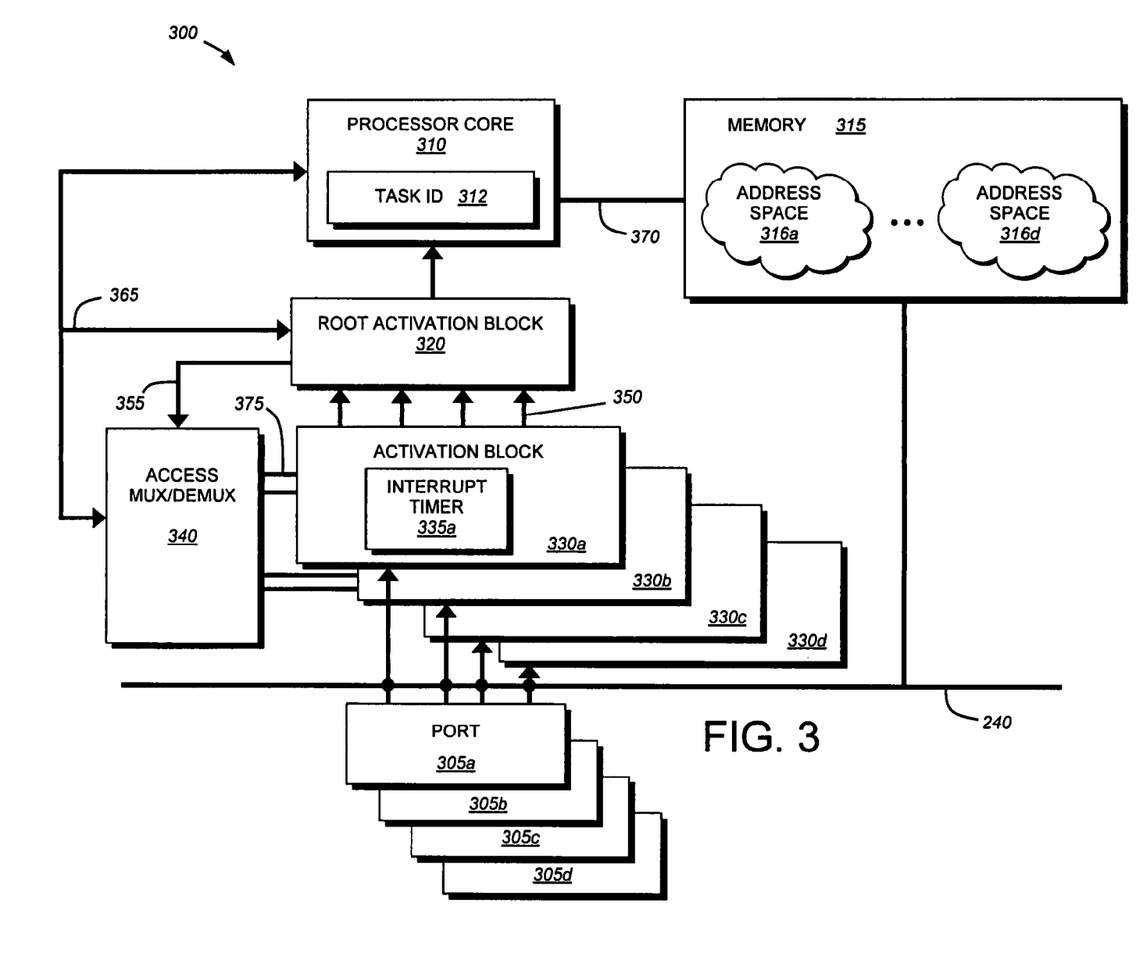
FIG. 3 is a schematic block diagram illustrating network adapter logic that may be advantageously used with an embodiment of the present invention.

FIG. 3 is a schematic block diagram illustrating a network adapter, such as an HBA 300 adapted to implement isochronous task switching in accordance with an embodiment of the present invention. The illustrative HBA 300 comprises a plurality of ports 305a-d, an embedded processor core 310, a dedicated memory 315, a root activation block 320, a plurality of activation blocks 330a-d, and an access multiplexer/demultiplexer (mux/demux) 340. In alternate embodiments, additional and/or differing components may be utilized.

Each port 305 comprises the mechanical, electrical, and signaling circuitry needed to pass FC frames to/from the appliance 200 and the network through the port. "Passing" a frame through a port, as used herein, may include sending the frame to the network from the port and/or receiving the frame from the network at the port. Each port 305 is also coupled to a corresponding activation block 330 and is configured to signal an interrupt condition to the activation block 330 in response to sending and/or receiving a FC frame. According to alternate embodiments, where the multi-protocol security appliance 200 may be coupled to other communication media, such as Ethernet and/or wireless links, the ports 305a-d may comprise the mechanical, electrical, and signaling circuitry needed to send and/or receive data via that media.

According to the illustrative embodiment, the embedded processor core 310 is configured to execute a predetermined number of tasks. Exemplary tasks include extracting and altering a header of an incoming FC frame depending on which port received the frame, generating acknowledgement (ACK) or non-acknowledgement (NACK) messages in response to a received frame, and/or generating periodic "heartbeat" messages to maintain the status of a network link. To handle the high data rate (and corresponding low interrupt latency) of a FC connection, the processor core 310 is configured to switch tasks faster than would ordinarily be possible using a conventional operating system (OS) or Real-Time Operating System (RTOS) stored in memory. Therefore, task selection is accomplished via hardware scheduling using the individual dedicated interrupt controllers (activation blocks 330a-d).

In the illustrative embodiment, one activation block 330 is provided for each task the processor core 310 may execute. In one embodiment, the current task is determined by which port received the FC frame. As such, one activation block 330 is provided for each port 305. For example, upon receiving the FC frame at port 305a, the corresponding activation block 330a signals the root activation block 320 to generate an interrupt. The activation block 330a may also contain an interrupt timer 335a configured to generate an interrupt signal in the absence of receipt of a frame after a predetermined amount of time and/or periodically. For example, the HBA 300 may be configured to maintain the status of a network link by generating periodic "heartbeat" messages, wherein each "heartbeat" is triggered in response to the interrupt timer 335a reaching a predetermined value, such as zero. The interrupt timer 335a then may reset to an initial value to begin counting toward the predetermined value again.

The root activation block 320 receives the interrupt signal, correlates the signal with a Task ID, and sends an interrupt and the Task ID to the processor core 310. Illustratively, the Task ID is a value corresponding to a predetermined task and stored as a bit vector in a register 312 accessible by the processor core 310. For example, where the processor core 310 is configured to execute up to four tasks, the first task may be identified by a bit vector of "00" in the register 312. The root activation block 320 may also apply the Task ID as an input to the mux/demux 340 to select the corresponding activation block 330a for communication with the processor core 310.

In response to receiving the interrupt and Task ID, the processor core 310 saves the state of its current task to memory 315 in, e.g., a dedicated memory address space 316b and rapidly switches to a new task identified by the Task ID. The processor core 310 then accesses another dedicated memory address space 316a corresponding to the new task. Thus, the present invention accomplishes task switching without requiring an OS or RTOS to perform interrupt processing at the HBA 300.

Therefore, in the illustrative example wherein the processor core 310 is configured to execute up to four tasks, and wherein the current task is determined by which port received the FC frame, the HBA 300 may comprise four ports 305a-d, four activation blocks 330a-d, and four dedicated memory address spaces 316a-d. To identify the current task and corresponding activation block and address space, the illustrative Task ID comprises a value between zero and three, represented by a bit vector two bits in length.

Any number of tasks may be triggered by the hierarchical array of interrupt controllers (activation blocks), and the number of ports and dedicated memory address spaces may differ from the number of activation blocks. According to alternate embodiments, multiple tasks may be associated with a single port, multiple tasks may share a common memory address space, and/or a task may not be associated with any port. For example, a first task may be associated with receiving a frame at a given port, and a second task may be associated with sending a frame from the same port. Consequently, two activation blocks may be coupled to the same port, with each activation block corresponding to one of the two tasks associated with the port.

As another example, a first task may be associated with receiving a frame at a first port, and a second task may be associated with sending the received frame from a second port. Two activation blocks may thus be coupled to the two ports, but the two tasks may share a common dedicated memory address space, where data associated with the frame may be stored. Depending on the Task ID (signifying either a send or receive operation), the processor core may be configured to perform different operations on the data stored in the common dedicated memory address space.

As yet another example, a given task, such as an administrative operation, may not be associated with any port. The activation block corresponding to the task may be coupled to another component of the network device, such as a hardware monitor, or may only contain an interrupt timer periodically generating interrupt signals.

Figure 4:
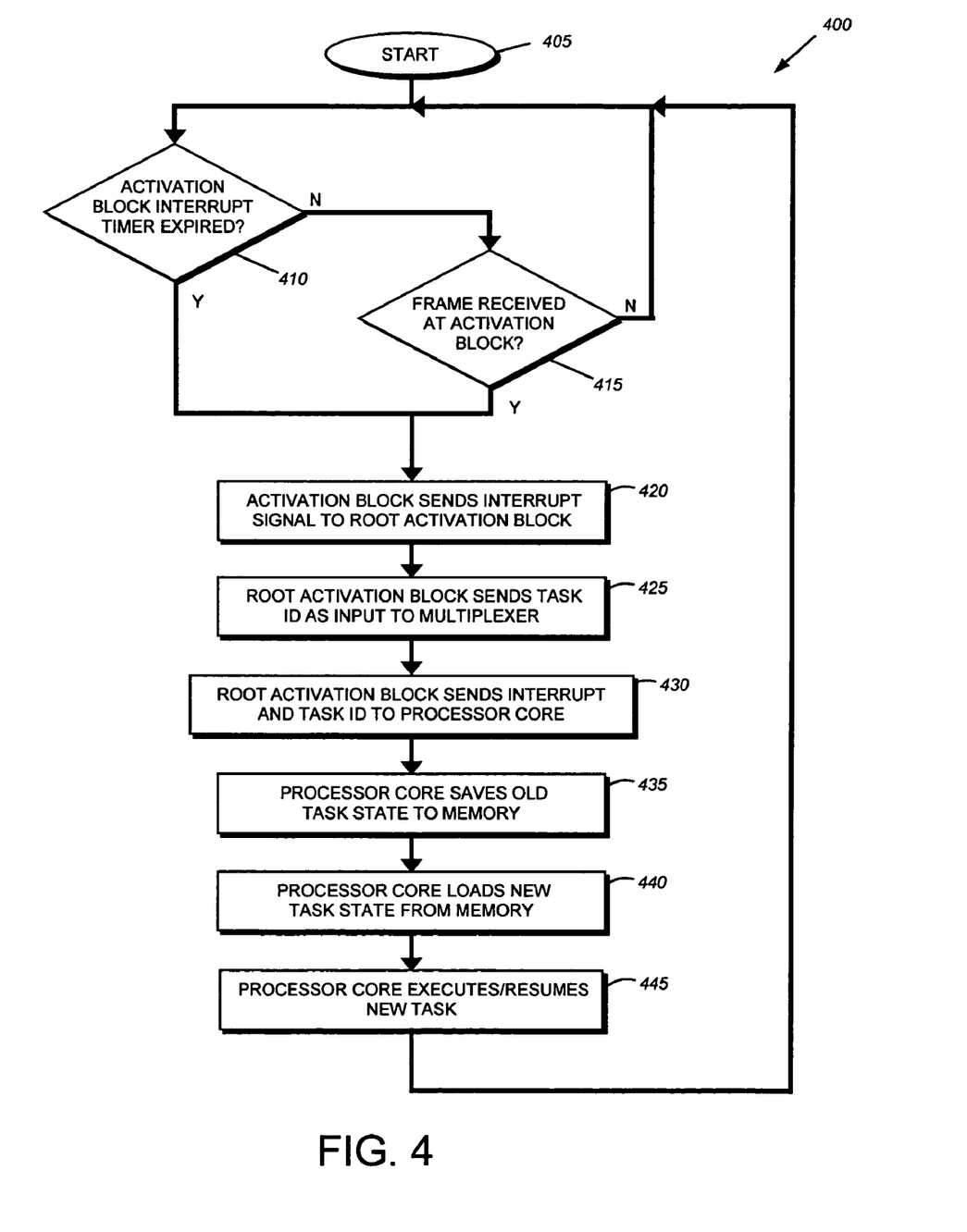
FIG. 4 is a flowchart illustrating a procedure for switching tasks of a processor core in accordance with an embodiment of the present invention.

FIG. 4 is a flowchart illustrating a procedure 400 for switching tasks of the processor core 310 in accordance with an embodiment of the present invention. In this illustrative embodiment, the processor core 310 "context switches" from an "old task" to a "new task" in response to receiving a FC frame at a given port 305a. The procedure 400 begins at step 405, where the processor core 310 is executing the old task. At step 410, the interrupt timer 335a of the activation block 330a is checked to determine whether it has expired (i.e., counted down to a zero value after a predetermined amount of time). Illustratively, the interrupt timer 335a may be used to trigger any task scheduled to occur periodically or after a predetermined amount of time. For example, where the security appliance 200 expects to receive an acknowledgement (ACK) message from a client 102 in response to a FC frame transmitted to the client 102 from the port 305a, the interrupt timer 335a corresponding to the port 305a may be initialized to a timeout value. Expiration of the interrupt timer 335a prior to receipt of the expected ACK message may indicate an error condition and/or prompt the security appliance 200 to retransmit the FC frame.

If the interrupt timer 335a has not expired, the procedure 400 continues to step 415, where a determination is made as to whether a frame is received at the port 305a corresponding to the activation block 330a. Illustratively, if neither condition of steps 410 and 415 has occurred, the procedure 400 loops back to step 410 and the processor core 310 continues executing the old task until an interrupt condition occurs that triggers a context switch to the new task (i.e., interrupt timer 335a reaches zero or a frame is received at port 305a). If either condition of steps 410 or 415 has occurred, the procedure 400 prepares the processor core 310 for a context switch by continuing to step 420.

According to the illustrative embodiment, at step 420 the activation block 330a sends an interrupt signal to the root activation block 320. As discussed above, each activation block corresponds to a task and thereby to a Task ID to allow the root activation block to correlate the interrupt signal to an appropriate Task ID, i.e., the root activation block identifies the appropriate Task ID associated with the interrupt signal received. At step 425, the root activation block 320 sends a bit vector representing the Task ID as a control (selection) input 355 to the mux/demux 340 to thereby select the corresponding activation block 330a for communication with the processor core 310. At step 430, the root activation block 320 also sends an interrupt and the Task ID to the processor core 310 to initiate the context switch. Note that the interrupt signal sent from the activation block 305a to the root activation block 320 may include the interrupt sent from the root activation block 320 to the processor core 310. Alternatively, the root activation block 320 may generate the interrupt in response to the interrupt signal.

Illustratively, the processor core 310 stores the Task ID as a bit vector in a register 312. At step 435, in response to the interrupt from the root activation block 320, the processor core 310 ceases execution of the old task and saves the state of the old task to memory 315. Illustratively, the old task state may be stored in a corresponding dedicated memory address space 316 so that execution of the old task may be resumed later. At step 440, the processor core 310 loads the new task state, as identified by the Task ID, from its corresponding dedicated memory address space 316a. Finally, at step 445, the processor core 310 executes and/or resumes the new task, thereby completing the context switch. While the processor core 310 executes the new task, the procedure 400 loops back to steps 410 and 415 to await further interrupt conditions (e.g., a FC frame being received at port 305b).

As an additional feature of the illustrative embodiment, during execution of the new task the processor core 310 may communicate with the activation block 330a selected by the mux/demux 340 to send or receive memory address information and/or data (e.g., FC frame data from the port 305a). The memory 315, ports 305a-d, and processing elements of the HBA 300 may also communicate with other elements of the security appliance 200 via the system bus 240. Thus, a low interrupt latency and fast context switching HBA 300 may serve as the network adapter 300a of the multi-protocol security appliance 200 coupled to a FC network.

According to the illustrative embodiment, all or part of the above-described embedded data processing system may be implemented as a Field Programmable Gate Array (FPGA) comprising generic programmable logic (as the multiplexed hierarchy of activation blocks 320, 330a-d) interfaced with an embedded microprocessor (as the processor core 310). An embedded microprocessor configured to isochronously switch between a predetermined number of tasks using the above-described hierarchical arrangement of interrupt controllers implemented on a FPGA offers advantages in predictability, reliability, power consumption, and latency, as opposed to utilizing a conventional OS or RTOS stored in a memory. Advantageously, the FPGA may also be configured to trigger any number of tasks in the microprocessor in response to any number of interrupt conditions at a sufficiently low interrupt latency to handle frames transmitted by a FC connection.

According to an alternate embodiment, the above-described embedded data processing system may comprise discrete components interconnected by channels on a printed circuit board (PCB). According to yet another alternate embodiment, all or part of the above-described embedded data processing system may be implemented as an application-specific integrated circuit (ASIC) or other equivalent device. Other variations or combinations as would be apparent to those of ordinary skill in the art are considered within the scope of the invention.

The foregoing description has been directed to specific embodiments of this invention. It will be apparent, however, that other variations and modifications may be made to the described embodiments, with the attainment of some or all of their advantages. For instance, it is expressly contemplated that the procedures, processes, layers, tasks, and/or modules described herein may be implemented in hardware, software, embodied as a computer-readable medium having executable program instructions, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for switching tasks of a processor in a network adapter of a computer networking appliance, comprising:
   extracting and altering, by the processor, a header of an incoming frame depending on which port of a plurality of ports the frame is received;
   in response to the incoming frame passing through a first port of the plurality of ports, generating, by a timer, an interrupt signal at one of a plurality of individual dedicated interrupt controllers of a hierarchical array of interrupt controllers;
   transmitting the interrupt signal to a root interrupt controller of the hierarchical array;
   selecting, by a multiplexer/demultiplexer using a task identifier, one of the plurality of individual dedicated interrupt controllers for a communication with the processor wherein a plurality of dedicated address spaces within a memory of the network adaptor are each associated with at least one of a predetermined number of tasks executable by the processor, and wherein the task identifier designates one of the dedicated address spaces for access by the processor;
   transmitting an interrupt and the task identifier to the processor;
   identifying a second task and switching, isochronously, by the processor, from a first task to the second task in response to the interrupt and the task identifier being received at the processor, the second task identified by the task identifier wherein switching further comprises,
      saving a first state of the first task to a corresponding dedicated address space of the memory, and
      loading a second state of the second task from the one dedicated address space designated by the task identifier; and
   accessing a dedicated memory address space corresponding to the second task.

2. The method of claim 1 further comprising:
   associating a second port of the network adapter with one of the plurality of individual dedicated interrupt controllers.

3. The method of claim 1 wherein generating the interrupt signal is in response to the timer reaching a predetermined value.

4. The method of claim 1 wherein generating the interrupt signal is in response to a signal from a component of the computer networking appliance.

5. A non-transitory computer readable medium containing executable program instructions executed by a processor, comprising:
   program instructions that extract and alter a header of an incoming frame depending on which port of a plurality of ports the frame is received;
   program instructions that generate, by a timer, an interrupt signal at one of a plurality of individual dedicated interrupt controllers of a hierarchical array of interrupt controllers in response to the incoming frame passing through a first port of the plurality of ports;
   program instructions that transmit the interrupt signal to a root interrupt controller of the hierarchical array;
   program instructions that select, by a multiplexer/demultiplexer using a task identifier, one of the plurality of individual dedicated interrupt controllers for a communication with the processor wherein a plurality of dedicated address spaces within a memory of a network adaptor are each associated with at least one of a predetermined number of tasks executable by the processor, and wherein the task identifier designates one of the dedicated address spaces for access by the processor;
   program instructions that transmit an interrupt and the task identifier to the processor;
   program instructions that identify a second task and switch, isochronously, the processor from a first task to the second task in response to the interrupt and the task identifier being received at the processor, the second task identified by the task identifier wherein switching further comprises,
      program instructions that save a first state of the first task to a corresponding dedicated address space of the memory, and
      program instructions that load a second state of the second task from the one dedicated address space designated by the task identifier; and
   program instructions that access a dedicated memory address space corresponding to the second task.

6. The non-transitory computer readable medium of claim 5 further comprising:
   program instructions that associate a second port of the network adapter with one of the plurality of individual dedicated interrupt controllers.

7. The non-transitory computer readable medium of claim 5 wherein the generation of the interrupt signal is in response to the timer reaching a predetermined value.

8. The non-transitory computer readable medium of claim 5 wherein the generation of the interrupt signal is in response to a signal from a component of the computer networking appliance.

9. An intermediate network device, comprising:
   a processor configured to extract and alter a header of an incoming frame depending on which port of a plurality of ports the frame is received;
   a timer configured to generate an interrupt signal at one of a plurality of individual dedicated interrupt controllers of a hierarchical array of interrupt controllers in response to the incoming frame passing through a first port of the plurality of ports;
   a multiplexer/demultiplexer using a task identifier configured to select one of the plurality of individual dedicated interrupt controllers for a communication with the processor;
   a root interrupt controller of the hierarchical array configured to receive the interrupt signal from the one of the plurality of individual dedicated interrupt controllers of the hierarchical array of interrupt controllers;
   the processor further configured to receive an interrupt and the task identifier from the root interrupt controller, save the state of a current task being executed by the processor at the time the interrupt is received by the processor in response to receiving the interrupt and task identifier from the root interrupt controller, and isochronously switch to a new task identified by the received task identifier; and a network adapter configured to have a plurality of dedicated address spaces on a memory, each dedicated address space associated with at least one of a predetermined number of tasks executable by the processor, and wherein the task identifier designates one of the dedicated address spaces for access by the processor, wherein the processor is further configured to save the state of the current task to a corresponding dedicated address space of the memory, and load the state of the new task from the one dedicated address space designated by the task identifier.

10. The intermediate network device of claim 9 wherein the generation of the interrupt signal is in response to a signal from a component of a computer networking appliance.

11. The intermediate network device of claim 9 wherein the generation of the interrupt signal is in response to the timer reaching a predetermined value.

12. The intermediate network device of claim 9 wherein the processor is further configured to associate a second port of the network adapter with one of the plurality of individual dedicated interrupt controllers.

13. The intermediate network device of claim 9 wherein the incoming frame passing through the first port of the plurality of ports comprises a Fibre Channel (FC) frame.

14. The intermediate network device of claim 9 further comprising:
the multiplexer/demultiplexer (mux/demux) coupled to a plurality of activation blocks, a root activation block, and the processor, wherein the root activation block is configured to apply the task identifier as an input to the mux/demux to select one of the plurality of activation blocks for communication with the processor.

15. The intermediate network device of claim 9 wherein the processor is operably connected to a computer comprising a multi-protocol data security appliance.

16. The intermediate network device of claim 9 wherein the network adapter comprises a Field Programmable Gate Array (FPGA).

17. The intermediate network device of claim 9 wherein the processor is further configured to implement an operating system stored in the memory.

18. The intermediate network device of claim 9 wherein the processor is further configured to receive the task identifier from a root activation block and store the task identifier in a register of the processor as a bit vector.

* * * * *